July 10, 1934.  D. MARINSKY  1,966,256
METHOD OF MANUFACTURING SEPARABLE FASTENERS
Filed Oct. 22, 1932  2 Sheets-Sheet 1
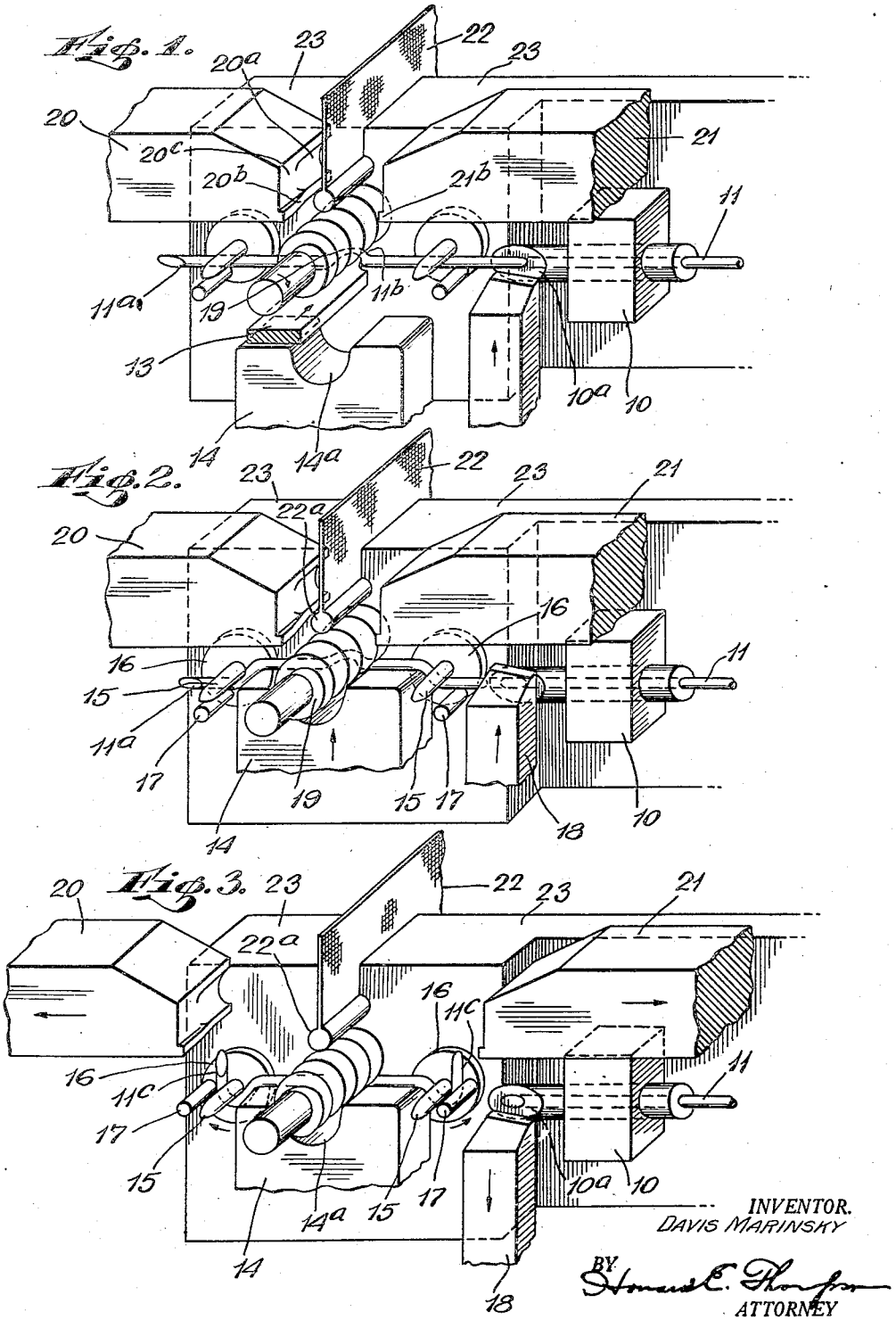
INVENTOR.
DAVIS MARINSKY
ATTORNEY

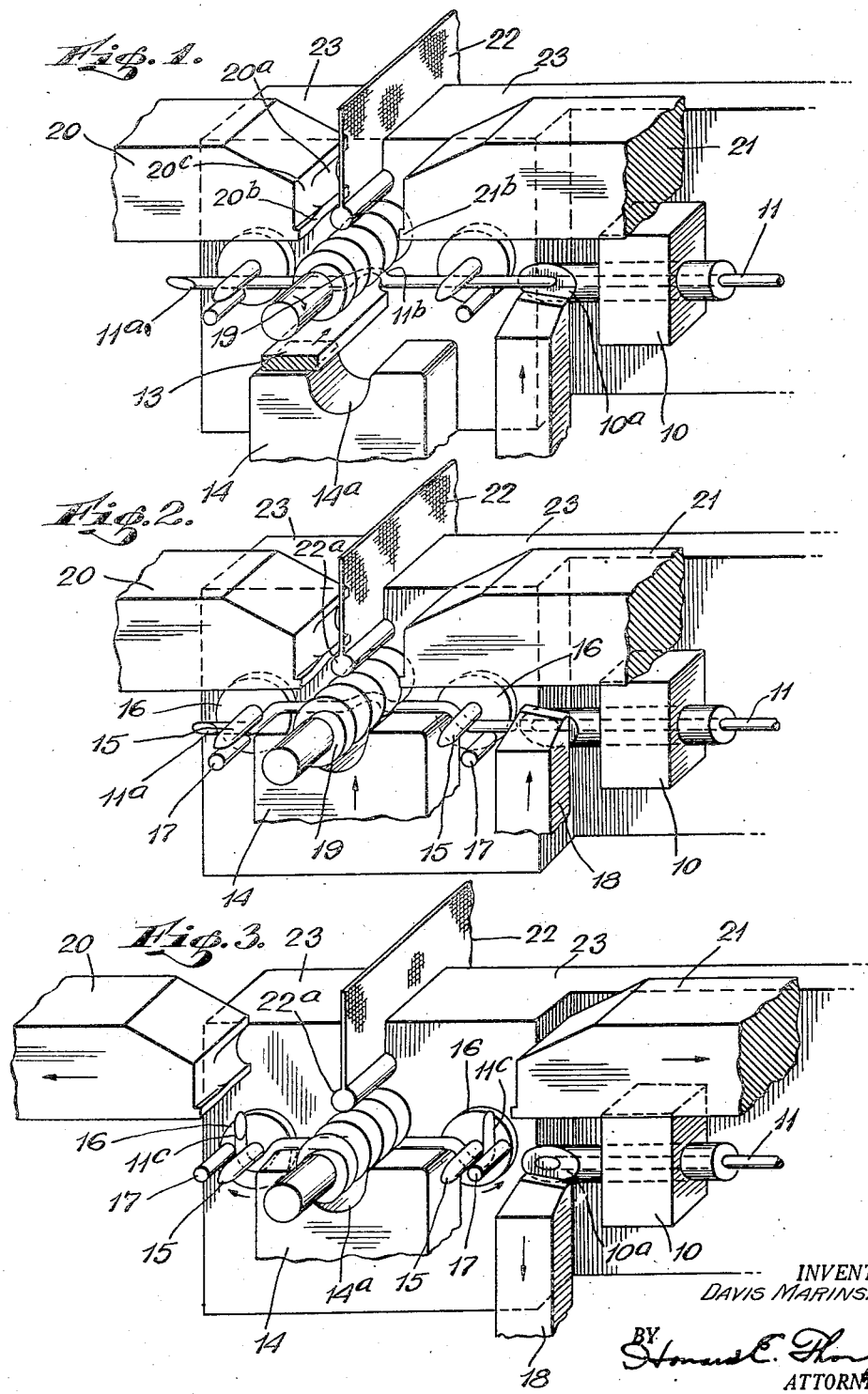

Patented July 10, 1934

1,966,256

UNITED STATES PATENT OFFICE 1,966,256

METHOD OF MANUFACTURING SEPARABLE FASTENERS

Davis Marinsky, New York, N. Y.

Application October 22, 1932, Serial No. 639,023

20 Claims. (Cl. 29—148)

This invention relates to separable fasteners and particularly to the method of shaping, forming and attaching coupling links of fasteners of this class to a mounting tape or body; and the object of the invention is to provide a method which consists in feeding a strand of predetermined material into a machine, cutting off a workpiece from the strand, then bending, curling and otherwise forming the workpiece to form a coupling element having end portions which are shaped to pierce a mounting strip or body in coupling the links thereto; a further object being to provide a method which consists in applying and shaping a link on a feed mandrel which serves to feed said links and the mounting strip through the machine, as well as to space the links one from the other a distance substantially equal to the thickness of the strand employed in forming the links so as to provide on the finished product accurate spacing of the links on said mounting tape; a further object being to provide a method of shearing the strand or workpiece so as to provide pronged or pointed ends thereon, facilitating the piercing of the mounting tape; a further object being to provide a method which consists in compressing and securing the links to the mounting tape through a series of successive pinching operations; and with these and other objects in view, the invention consists in a method of manufacturing fastener devices of the class described as more clearly hereinafter defined and claimed.

The invention is fully disclosed in the following specification, of which the accompanying drawings form a part, in which the separate parts of my improvement are designated by suitable reference characters in each of the views, and in which:

Fig. 1 is a diagrammatic perspective view of an arrangement of die parts employed in carrying out my method and showing the first steps in the operation thereof.

Figs. 2, 3 and 4 are views similar to Fig. 1 showing successive steps in the method.

Fig. 4a is a sectional view through part of the apparatus shown in Fig. 4 with parts in a different position and showing a further step in the process.

Fig. 5 is a view similar to Figs. 1 to 4 inclusive showing the last step in the method or the completion of one cycle of operation of the machine.

Fig. 6 is a sectional detail view of two pinching or compressing dies which I employ; and, Fig. 7 is a detail view of a part of a stringer or fastener illustrating the arrangement of the coupling links thereon.

In the accompanying drawings, I have shown for the purpose of illustrating one way of carrying my method into effect, a diagrammatic arrangement of forming tools in the several positions assumed thereby during a complete cycle of operation of shaping or forming a link and attaching it to a mounting tape or body.

While the method herein disclosed illustrates the shaping of a workpiece of predetermined contour, it will be apparent that my invention is not limited to the specific workpiece herein disclosed nor to the specific shape of the resulting link formed thereby.

In the several views, I have shown at 10 a workpiece guided through a strand of wire 11 as fed intermittently by a feeding means indicated at 12 in Fig. 5 of the drawings to expose a predetermined length of the wire beyond the beveled end 10a of the guide, forming beyond said end a workpiece 11a of predetermined length. With the workpiece in the position shown in Fig. 1 of the drawings, a kinking tool 13 engages the central part of the workpiece to form a kink or offset 11b therein, after which the tool 13 is withdrawn from the path of a plunger die 14 which moves upwardly between the central movable pins 15 of two rotatable curling members 16 beneath which the workpiece 11a was positioned when fed into the machine, said workpiece or the ends thereof being also disposed above rotatable pins 17 of said curling member 16, which in conjunction with the pins 15 serve to support the workpiece after the same has been sheared from the end 10a of the guide 10 by a shearing tool 18, moving over the surface 10a to form the pointed or pronged end on both ends of the workpiece as will be apparent. In this connection, it will be understood that the shearing tool 18 moves upwardly with the plunger die 14 and at the same time the pins 17 are rotated to a slight extent to engage and hold the ends of the workpiece. In the upward movement of the die 14, the part of the workpiece intermediate the pins 15 is offset upwardly and the result of this operation is illustrated in Fig. 2 of the drawings.

The next step of the method consists in lowering the shearing tool 18 and continuing the rotation of the curling members 16 so as to form hook ends 11c at the ends of the workpiece as clearly seen in Fig. 3 of the drawings. This operation is performed while the die 14 remains in the position last assumed thereby. On completing the formation of the hook ends 11c, the pins 15 are drawn into the members 16 so as to clear the outer surfaces thereof, permitting upward movement of the hook ends 11c of the workpiece. The die 14 is moved upwardly and the circular recess 14a thereof serves to shape the central part of the workpiece around the screw mandrel 19 with the workpiece positioned in one of a number of the recesses or grooves 19a therein, as is clearly illustrated in Fig. 4 of the drawings.

During this cycle of operation, two pinching and compressing tools 20, 21, arranged above the die 14, are moved inwardly toward each other to first pierce the pronged and hook ends 11c of the workpiece through a binding tape 22 positioned between said hook ends and arranged above the mandrel with an enlarged or reinforced edge 22a thereof disposed directly above said mandrel and centrally and longitudinally thereof.

The binding or mounting tape 22 passes through suitable guides 23 and is fed therethrough and through the machine by the screw mandrel 19 by virtue of the engagement of the workpieces therewith or the coupling loops 11d thereof formed by the die 14 and the tools 20, 21. In the first complete operation of the tools 20, 21 upon the hook ends of the workpiece, said ends, after piercing the tape 22, are only partially turned or riveted over, but this operation is completed through a series of successive operations of said tools as each formed workpiece or link is fed forwardly through the machine as later described.

After partially securing the first workpiece or link to the tape, the tools 20, 21 are withdrawn and the mandrel rotated to feed the link forwardly, after which the feeding tool 12 is again put in operation to extend the wire into position beneath and adjacent the rearward groove 19a in the mandrel 19 and between the pins 15 and 17 as is illustrated in Fig. 5 of the drawings, after which the next step of kinking the central portion of the new workpiece is performed, as is illustrated in Fig. 1, and the above described cycle of operations continues in the shaping, forming and attaching of the workpiece to the tape in juxtaposition to the first workpiece applied thereto. This operation continues in forming the stringers of separable fasteners of the class under consideration of any desired length.

The adjacent ends or surfaces of the pinching and compressing tools 20, 21 are provided adjacent their inner sides with curved walls 20a, 21a, which engage the hook ends 11c of the link to pierce them through the tape 22 and also to curl the pronged ends outwardly in the direction of the beaded or enlarged edge 22a of the tape, after said pronged ends have passed through the tape as is illustrated in Fig. 4a of the drawings. In this connection, it will be noted that the groove 21a is of less curvature than the groove 20a so that one hook end of the link will pierce the tape 22 at a point inwardly of the other hook end as is indicated in Fig. 7 of the drawings so as to prevent rupturing of the tape and to provide a secure binder for the coupling links on the tape.

In the first operation of the tools 20, 21, the hook ends are only partially curled, but as the first link advances forwardly by the screw mandrel 19, the next operation of the tools 20, 21 will further curl and compress the hook ends onto the tape, this result being accomplished by virtue of the outward taper of the grooves 20a, 21a as indicated in Fig. 6 of the drawings. It will also be understood that the tools 20, 21 serve to kink the link inwardly above the mandrel 19 and outwardly of the bead or enlargement 22a as is indicated at 11e in Fig. 4a of the drawings. This operation is performed by flanges 20b, 21b on the tools 20, 21.

As the links continue to advance forwardly between the tools 20, 21, the curvature of the grooves 20a, 21a is gradually reduced until they run into substantially straight outer surfaces 20c, 21c and leave only the flanges 20b, 21b. It will thus be seen that the final operation of the tools 20, 21 upon the link will substantially flatten the hook ends thereof upon the tape 22 and in this operation compressing the enlarged or beaded edge 20a which will serve to key and retain the links against movement with respect to the tape and maintain the outer coupling ends of the links in definitely spaced relation with respect to each other. The above operation is also made possible by virtue of the final kinking of the links as at 11e by the flanges 20b, 21b adjacent the outer surfaces of the tools 20, 21.

It will of course be understood that as the successive operations are being performed on the first link, the other operations are being performed on adjacent links, the operation continuing in the production of stringers with an arrangement of coupling members on the tape in any desired length. It will be understood that while I have shown certain types of dies and forming tools for shaping and applying the links to the mounting tape, my invention is not limited to the structural details herein illustrated, as other means may be employed for carrying my method into effect, and various other changes in and modifications of the method herein described may be made within the scope of the appended claims without departing from the spirit of my invention or sacrificing its advantages.

Having fully described my invention, what I claim as new and desire to secure by Letters Patent, is:

1. The herein described method of manufacturing fastener devices of the class described which consists in supporting a mounting tape in a suitable machine, feeding a workpiece strand into the machine, shearing the strand to form a workpiece of predetermined length and having pronged ends, shaping the central portion of the workpiece around a screw mandrel to form a coupling loop and shaping and moving the pronged end portions of the workpiece into position at opposite sides of said mounting tape, then forcing said pronged end portions toward each other to pierce the tape adjacent one side edge thereof, and then curling and compressing the projecting ends of the workpiece upon opposite side faces of the tape.

2. The herein described method of manufacturing fastener devices of the class described which consists in supporting a mounting tape in a suitable machine, feeding a workpiece strand into the machine, shearing the strand to form a workpiece of predetermined length and having pronged ends, shaping the central portion of the workpiece around a screw mandrel to form a coupling loop and shaping and moving the pronged end portions of the workpiece into position at opposite sides of said mounting tape, then forcing said pronged end portions toward each other to pierce the tape adjacent the side edge thereof, then curling and compressing the projecting ends of the workpiece upon opposite side faces of the tape, in a series of pinching and compressing operations performed in the feeding of the links attached to said tape through the machine.

3. The herein described method of manufacturing fastener devices of the class described which consists in supporting a mounting tape in a suitable machine, feeding a workpiece strand into the machine, shearing the strand to form a workpiece of predetermined length and having pronged ends, shaping the central portion of the workpiece around a screw mandrel to form a coupling loop and shaping and moving the pronged end portions of the workpiece into position at opposite sides of said mounting tape, then forcing said pronged end portions toward each other to pierce the tape adjacent the side edge thereof, then curling and compressing the projecting ends of the workpiece upon opposite side faces of the tape in a series of pinching and compressing operations performed in the feeding of the links attached to said tape through the machine, and rotating the mandrel to intermittently feed the links and tape through the machine and to intermittently position the tape to receive a successive series of links and to equally space the same thereon.

4. The herein described method of manufacturing fastener devices of the class described which consists in supporting a mounting tape in a suitable machine, feeding a workpiece strand into the machine, shearing the strand to form a workpiece of predetermined length and having pronged ends, shaping the central portion of the workpiece around a screw mandrel to form a coupling loop and shaping and moving the pronged end portions of the workpiece into position at opposite sides of said mounting tape, then forcing said pronged end portions toward each other to pierce the tape adjacent the side edge thereof, then curling and compressing the projecting ends of the workpiece upon opposite side faces of the tape in a series of pinching and compressing operations performed in the feeding of the links attached to said tape through the machine, and rotating the mandrel to intermittently feed the links and tape through the machine and to intermittently position the tape to receive a successive series of links and to equally space the same thereon, and forming a kink centrally of the workpiece prior to the formation of said coupling loop.

5. The herein described method of manufacturing fastener devices of the class described which consists in supporting a mounting tape in a suitable machine, feeding a workpiece strand into the machine, shearing the strand to form a workpiece of predetermined length and having pronged ends, shaping the central portion of the workpiece around a screw mandrel to form a coupling loop and shaping and moving the pronged end portions of the workpiece into position at opposite sides of said mounting tape, then forcing said pronged end portions toward each other to pierce the tape adjacent the side edge thereof, then curling and compressing the projecting ends of the workpiece upon opposite side faces of the tape in a series of pinching and compressing operations performed in the feeding of the links attached to said tape through the machine, rotating the mandrel to intermittently feed the links and tape through the machine and to intermittently position the tape to receive a successive series of links and to equally space the same thereon and forming a kink centrally of the workpiece prior to the formation of said coupling loop, the edge of the mounting tape to which the links are attached being enlarged and compressing the ends of the links on said enlargement to retain the same against movement thereon.

6. The herein described method of manufacturing fastening devices of the class described which consists in the successsive steps of forming in one unit apparatus independent link members having pronged end portions, and then piercing said pronged end portions through a mounting tape disposed therebetween adjacent one edge portion of the tape to attach said coupling links to the tape with the coupling ends thereof projecting outwardly from said side edge of the tape and arranged in equally spaced relation with respect to each other longitudinally of the tape.

7. The herein described method of manufacturing fastening devices of the class described which consists in the successive steps of forming independent link members having pronged end portions, piercing said pronged end portions through a mounting tape disposed therebetween adjacent one edge portion of the tape to attach said coupling links to the tape with the coupling ends thereof projecting outwardly from said side edge of the tape and arranged in equally spaced relation with respect to each other longitudinally of the tape, and forming the successive links from an elongated strand-like workpiece intermittently fed into position adjacent said tape.

8. The herein described method of manufacturing fastening devices of the class described which consists in the successive steps of forming independent link members having pronged end portions, piercing said pronged end portions through a mounting tape disposed therebetween adjacent one edge portion of the tape to attach said coupling links to the tape with the coupling ends thereof projecting outwardly from said side edge of the tape and arranged in equally spaced relation with respect to each other longitudinally of the tape, forming the successive links from an elongated strand-like workpiece intermittently fed into position adjacent said tape, and intermittently feeding the coupling links and tape to position said tape to receive the successive links applied thereto.

9. The herein described method of manufacturing fastening devices of the class described which consists in the successive steps of forming independent link members having pronged end portions, piercing said pronged end portions through a mounting tape disposed therebetween adjacent one edge portion of the tape to attach said coupling links to the tape with the coupling ends thereof projecting outwardly from said side edge of the tape and arranged in equally spaced relation with respect to each other longitudinally of the tape, forming the successive links from an elongated strand-like workpiece intermittently fed into position adjacent said tape, intermittently feeding the coupling links and tape to position said tape to receive the successive links applied thereto, and the pronged ends of the links piercing the mounting tape at transversely spaced intervals.

10. The herein described method of manufacturing fastening devices of the class described which consists in the successive steps of forming independent link members having pronged end portions, piercing said pronged end portions through a mounting tape disposed therebetween adjacent one edge portion of the tape to attach said couplings links to the tape with the coupling ends thereof projecting outwardly from said side edge of the tape and arranged in equally spaced relation with respect to each other longitudinally of the tape, forming the successive links from an elongated strand-like workpiece intermittently fed into position adjacent said tape, intermittently feeding the coupling links and tape to position said tape to receive the successive links applied thereto, the pronged ends of the links piercing the mounting tape at transversely spaced intervals, and curling and compressing the pronged ends of the links on opposed surfaces of the tape.

11. The herein described method of manufacturing fastening devices of the class described in a successive series of steps which consists in feeding a metallic strand into a machine between central loop forming dies and curling tools disposed at opposite sides of said dies, shearing said strand outwardly of one of said curling tools in such manner as to form a workpiece, the end portions of which project beyond said curling tools, kinking the central portion of the workpiece, then fashioning the end portions of said workpiece by said curling tools to form hook-shaped ends, then shaping the central portion of the workpiece to partially form the loop therein by said dies and to dispose the hook ends at opposite sides of a mounting tape arranged above said dies, then moving pinching tools inwardly toward each other to force the hook ends of said workpiece into engagement with said tape, and to complete the formation of said loop and the coupling link, with the loop thereof arranged beyond one edge of said mounting tape.

12. The herein described method of manufacturing fastening devices of the class described which consists in feeding a metallic strand into a machine between central loop forming dies and curling tools disposed at opposite sides of said dies, shearing said strand outwardly of one of said curling tools in such manner as to form a workpiece, the end portions of which project beyond said curling tools, kinking the central portion of the workpiece, then fashioning the end portions of said workpiece by said curling tools to form hook-shaped ends, then shaping the central portion of the workpiece to partially form the loop therein by said dies and to dispose the hook ends at opposite sides of a mounting tape arranged above said dies, then moving pinching tools inwardly toward each other to force the hook ends of said workpiece into engagement with said tape and to complete the formation of said loop and the coupling link, with the loop thereof arranged beyond one edge of said mounting tape, said loop being formed around a screw mandrel constituting one of said first named dies and intermittently rotating said mandrel to feed the coupling link and tape into position to receive successive and equally spaced links on said tape.

13. The herein described method of manufacturing fastening devices of the class described which consists in feeding a metallic strand into a machine between central loop forming dies and curling tools disposed at opposite sides of said dies, shearing said strand outwardly of one of said curling tools in such manner as to form a workpiece, the end portions of which project beyond said curling tools, kinking the central portion of the workpiece, then fashioning the end portions of said workpiece by said curling tools to form hook-shaped ends, then shaping the central portion of the workpiece to partially form the loop therein by said dies and to dispose the hook ends at opposite sides of a mounting tape arranged above said dies, then moving pinching tools inwardly toward each other to force the hook ends of said workpiece into engagement with said tape and to complete the formation of said loop and the coupling link, with the loop thereof arranged beyond one edge of said mounting tape, said loop being formed around a screw mandrel constituting one of said first named dies and intermittently rotating said mandrel to feed the coupling link and tape into position to receive successive and equally spaced links on said tape, and completing the attachment of the links to the tape through a series of successive operations of said pinching tools.

14. The herein described method of forming and mounting wire link members upon a mounting tape with the coupling elements of said link members projecting from one edge of the tape in equally spaced arrangement with respect to each other, which consists in successively forming wire link workpieces with pronged ends disposed on opposite sides of a mounting tape, forcing said pronged ends through the tape to project at opposite sides thereof, then curling and compressing the projected ends onto the tape in securing the links thereto, and piercing the pronged ends of each link through the tape at transversely spaced intervals.

15. The herein described method of forming and mounting wire link members upon a mounting tape with the coupling elements of said link members projecting from one edge of the tape in equally spaced arrangement with respect to each other, which consists in successively forming wire link workpieces with pronged ends disposed on opposite sides of a mounting tape, forcing said pronged ends through the tape to project at opposite sides thereof, then curling and compressing the projected ends onto the tape in securing the links thereto and piercing the pronged ends of each link through the tape at transversely spaced intervals, the edge of the tape to which said links are attached being enlarged and compressing the links on the enlargement of the tape so as to key said links against movement thereon.

16. The herein described method of forming fastening devices consisting of a mounting tape with coupling links mounted in connection with and projecting from one side edge of the tape, which consists in arranging a mounting tape having an enlarged side edge in a machine, with said enlarged edge adjacent a screw mandrel, forming the coupling loop of each link around said mandrel and arranging pronged ends of the link at opposite sides of said tape inwardly of said enlarged edge, then forcing the pronged ends through the tape to project said ends at opposite sides thereof, and curling and compressing the projecting ends onto the tape in securing the link thereto.

17. The herein described method of forming fastening devices of the class described in a successive series of operations which consists in first cutting wire workpieces to form pronged ends thereon, fashioning the workpieces centrally thereof to form the coupling members of the separate links of the fastener, then shaping and moving the pronged ends of the workpieces to opposite sides of an elongated mounting tape, then piercing the ends of the links through the mounting tape from opposite faces thereof and compressing the same thereon to secure the links on said tape, and intermittently feeding the formed and applied links and tape into position to receive adjacent links and in equally spacing the coupling members of said links longitudinally and outwardly of one side edge of the tape.

18. The herein described method of forming fastening devices of the class described in a successive series of operations which consists in first cutting wire workpieces to form pronged ends thereon, fashioning the workpieces centrally thereof to form the coupling members of the separate links of the fastener, then shaping and moving the pronged ends of the workpieces to opposite sides of an elongated mounting tape, then piercing the ends of the links through the mounting tape from opposite faces thereof and compressing the same thereon to secure the links on said tape, intermittently feeding the formed and applied links and tape into position to receive adjacent links and in equally spacing the coupling members of said links longitudinally and outwardly of one side edge of the tape, and curling and compressing the pronged end portions of the links on the tape in a successive series of pinching and compressing operations.

19. The herein described method of forming and mounting wire link members upon a mounting tape with the coupling elements of said link members projecting from one edge of the tape in equally spaced arrangement with respect to each other in a successive and uninterrupted series of operations consisting of first forming a wire link workpiece with pronged ends, then shaping the workpiece to dispose the pronged ends on opposite sides of a mounting tape, then forcing said pronged ends through the tape to project at opposite sides thereof, and then curling and compressing the projected ends onto the tape to secure the link thereto and successively forming, shaping and applying adjacent link members to the tape in said uninterrupted series of operations.

20. The herein described method of forming fastening devices and applying same to a mounting member in a successive and uninterrupted series of operations consisting in first cutting a wire workpiece to form pronged ends thereon, then fashioning the workpiece centrally thereof to form a coupling portion on said workpiece, then shaping and manufacturing the pronged ends of the workpiece to opposite sides of an elongated mounting member, then piercing said pronged ends through the mounting member from opposite faces thereof, and then compressing the same on the member to secure the link thereto and applying other successive links formed in said series of operations to spaced portions of the member producing in a continuous operation a complete fastener device including a mounting member with a plurality of coupling elements spaced longitudinally thereof.

DAVIS MARINSKY.